July 29, 1969     J. B. URBAN     3,458,171

SEAT RING FOR BALL VALVES

Filed May 8, 1967     4 Sheets-Sheet 1

INVENTOR
John B. Urban
BY Wood, Herron & Evans
ATTORNEYS

July 29, 1969     J. B. URBAN     3,458,171

SEAT RING FOR BALL VALVES

Filed May 8, 1967     4 Sheets-Sheet 2

John B. Urban
Wood, Herron & Evans
ATTORNEYS

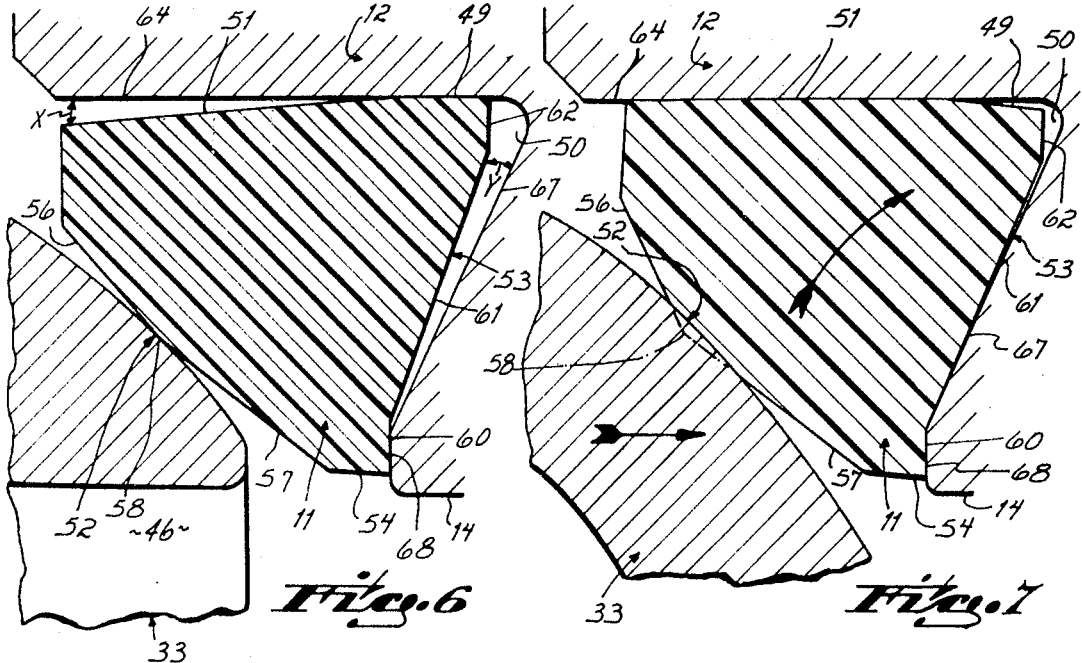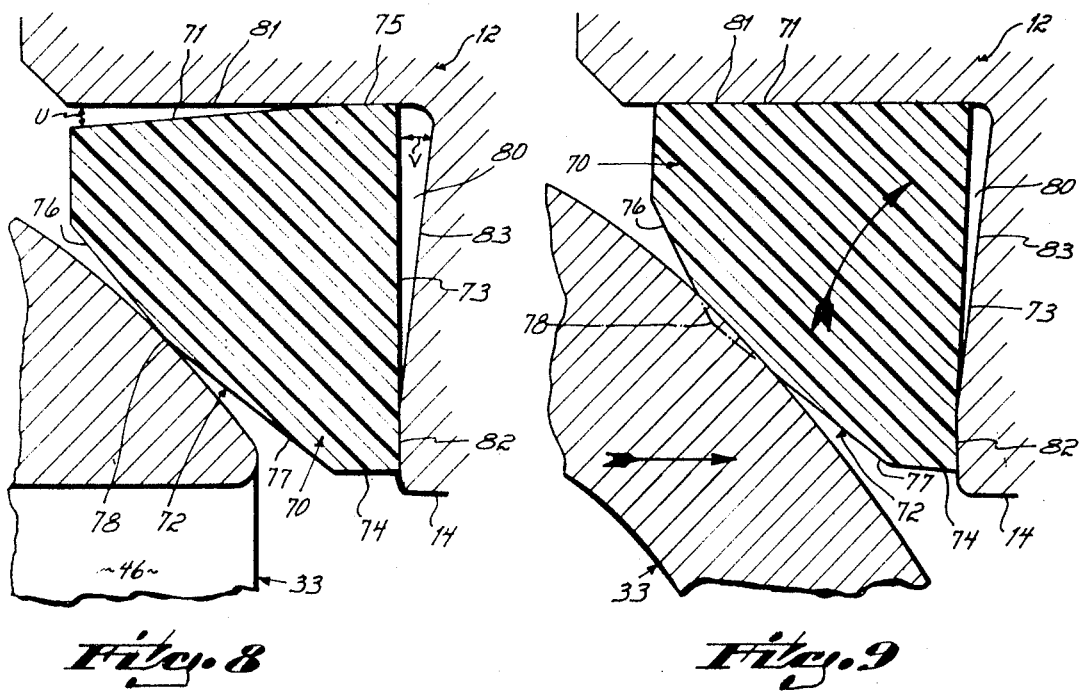

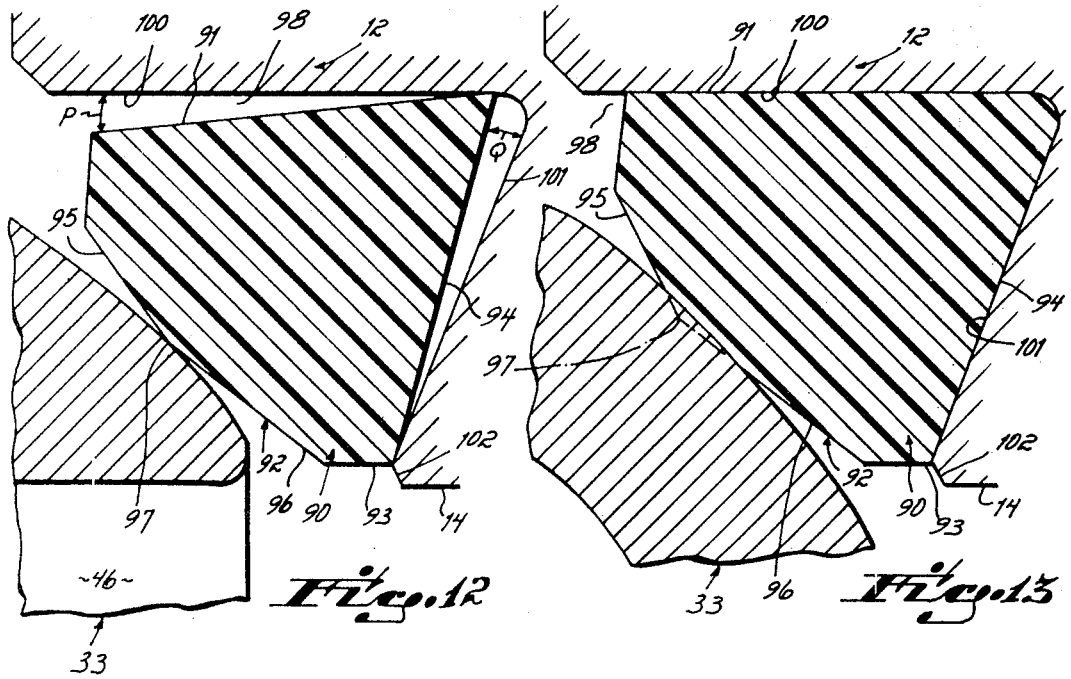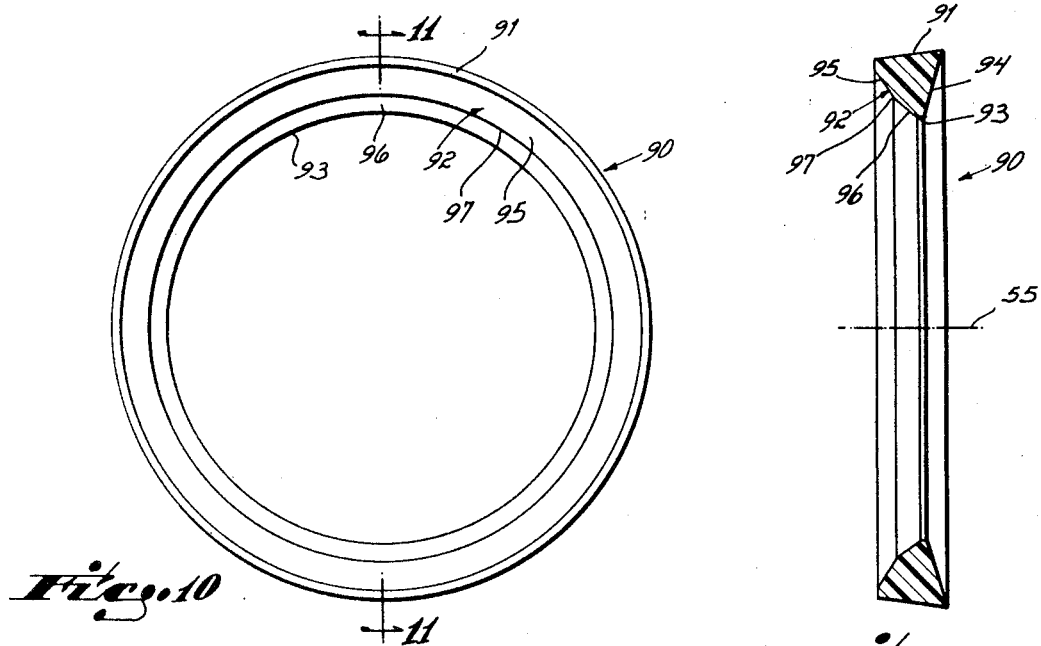

United States Patent Office 3,458,171
Patented July 29, 1969

3,458,171
SEAT RING FOR BALL VALVES
John B. Urban, Cincinnati, Ohio, assignor to The Lunkenheimer Company, Cincinnati, Ohio, a corporation of Delaware
Filed May 8, 1967, Ser. No. 636,934
Int. Cl. F16k 5/06, 27/06
U.S. Cl. 251—170             5 Claims

ABSTRACT OF THE DISCLOSURE

A ball valve including a rotatable, spherical plug having a diametral bore for controlling fluid flow between inlet and outlet ports in the valve body. Two flexible, annular seat rings surround the inlet and outlet ports and engage the ball. When the ball is assembled, the seat rings are placed under a greater load than the maximum load on a ball at rated line pressure. The seat rings engage the housing at their inner diameter, and the ball along a circular band located at a greater diameter. When the rings are loaded, the outermost portions of the rings rotate about the neutral axes of the rings away from the ball.

Background of the invention

This invention relates to ball valves and is particularly directed to a novel seat ring configuration and cooperating housing recess for providing a seal between a rotatable ball and the valve housing.

Ball valves of the type with which the present invention is concerned include a housing having inlet and outlet ports and a rotatable ball, or spherical plug member, having a diametral bore conventionally of the same diameter as the inlet and outlet ports. The ball is rotatable through substantially 90° to control fluid flow through the valve. It has in the past been conventional to provide resilient seat rings surrounding the inlet and outlet ports and in engagement with the ball. These seat rings support the ball and provide a seal between the ball and valve body.

In the prior art, one common approach to seat ring designs for ball valves, as exemplified by Newton Patent No. 2,297,161 and Bass et al. Patent No. 2,989,990, has been to provide a flexible seat ring in which the inner portion of the ring engages the ball closely adjacent to the inner diameter of the ring. This portion of the ring is forced outwardly, axially of the fluid bore, when a load is applied to the ball. The outermost portion of the seat ring remains generally stationary.

Prior art seat designs have been subject to one or more defects. For example, it has been difficult to provide a completely satisfactory seat which would seal effectively over a wide range of fluid pressures. Many prior art seat rings have also had a tendency to "blow out," or be forced out of position into the port area when the ball is turned to open or close the valve. Another difficulty encountered with various seat ring designs is the tendency of the seat rings to become damaged, i.e. nicked or torn when the valve is repeatedly opened or closed.

The principal object of the present invention is to provide a seat ring and associated body recess construction which will avoid these difficulties with prior art seats and will provide an effective, leak-proof seal over a wide range of pressure variations for protracted periods of usage.

Summary of the invention

The present invention resides in the configuration of the seat rings and in their relationship to the body recess in which they are mounted, and to the ball, whereby the seat rings operate or function in a completely novel manner.

More particularly, in a valve embodying seat rings constructed in accordance with the present invention, each annular seat ring surrounds one of the inlet or outlet ports. Each seat ring is received within an annular recess in the body and engages the body recess adjacent to the inner diameter of the seat ring. Each seat ring includes a ball engaging face in the form of a crest defined by two truncated conical surfaces. This crest initially engages the ball at a narrow band contact along a diameter spaced appreciably outwardly from the diameter at which the seat engages the recess. The recess is configurated to provide clearance for movement of both the rear wall of the seat, i.e. the wall away from the ball, and the outer wall of the seat, i.e. the outer diameter wall of the annular seat ring.

When the valve is assembled, the two seat rings are placed under a load greater than the maximum load applied to the ball at rated line pressure. As this load is applied, each seat ring rolls around its neutral axis away from the ball, i.e. the rear wall and outer wall of the seat ring move toward the adjacent walls of the body recess. The inner diameter of the seat ring remains in contact with the adjacent wall of the body, or may even move slightly toward the ball. The seat ring also is displaced to some extent outwardly toward the bottom, or outer diameter, of the recess.

In accordance with the present invention, the recess is configurated so that its outer wall is angulated with respect to a plane transverse to the axis of the valve to define with the ball a wedge-shaped space effective to restrain the seat and prevent it from being blown out when the valve is opened or closed.

At the same time the seat rolls about its neutral axis, the crest of the seat ring is slightly deformed so that the area of contact with the ball becomes a narrow band rather than a substantially line contact. This increase in area prevents the ring from being subjected to excessive unit loading.

When the valve is closed and the ball is subjected to line pressure, the upstream seal remains effective to provide a fluid-tight seal between the ball and housing. Specifically, since the preload applied to this seal is greater than the load at rated line pressure, the seal remains in pressure contact with the ball even though the ball is displaced toward the downstream seal. When the load is partially relieved on the upstream side, the seat rotates back around its neutral axis toward the ball with the crest remaining in sealing contact with the ball.

The roll of the seat cross sectional area about the neutral axis of the seat ring results in a greater elastic deformation of the seat than is obtained by bending, compressing or stretching the seat ring. This permits greater variations is the distance between the ball and body recess without greatly changing the force between the ball and seating ring. Thus, one important advantage of the present seat ring is that the valve remains tight longer even after appreciable wear on the rings and exhibits a more constant operating torque.

A still further advantage of the present seat configuration is that the seat ring is wedged in place and is not blown or extruded out of position into the ball when the valve is opened or closed.

Yet another advantage of the present seat configuration is that the ball engaging crest is formed of two conical surfaces which engage the ball at substantially equal angles so that the openings in the ball gradually climb over the crest as the ball is opened or closed without tearing or catching on the seating surface. Consequently, the present valves can be used for protracted periods without the need for replacing seat rings due to progressive damage to the seating surface.

These and other objects and advantages of the present invention will be more readily apparent from a consideration of the following detailed description of the drawings illustrating a preferred embodiment of the invention.

Brief description of the drawings

In the drawings:

FIGURE 6 is an enlarged, fragmentary cross-sectional view through a portion of the ball, the preferred seat ring and housing at the initial contact of the seat ring and ball during assembly of the valve.

FIGURE 7 is a cross-sectional view similar to FIGURE 6 showing the preferred seat ring in its loaded condition.

FIGURE 8 is an enlarged cross-sectional view through the housing, ball and the modified seat of FIGURES 4 and 5 at the initial contact of the seat ring and ball during assembly of the valve.

FIGURE 9 is a cross-sectional view similar to FIGURE 8 showing the modified seat ring in its loaded condition.

FIGURE 10 is a plan view of another form of modified seat ring.

FIGURE 11 is a cross-sectional view taken along line 11—11 of FIGURE 10.

FIGURE 12 is an enlarged fragmentary cross-sectional view through a portion of the housing, ball and the modified seat ring of FIGURES 10 and 11 at the initial contact of the seat ring and ball during assembly of the valve.

FIGURE 13 is a cross-sectional view similar to FIGURE 12 showing the modified seat ring in its loaded condition.

Description of the preferred embodiments

Figure 1:
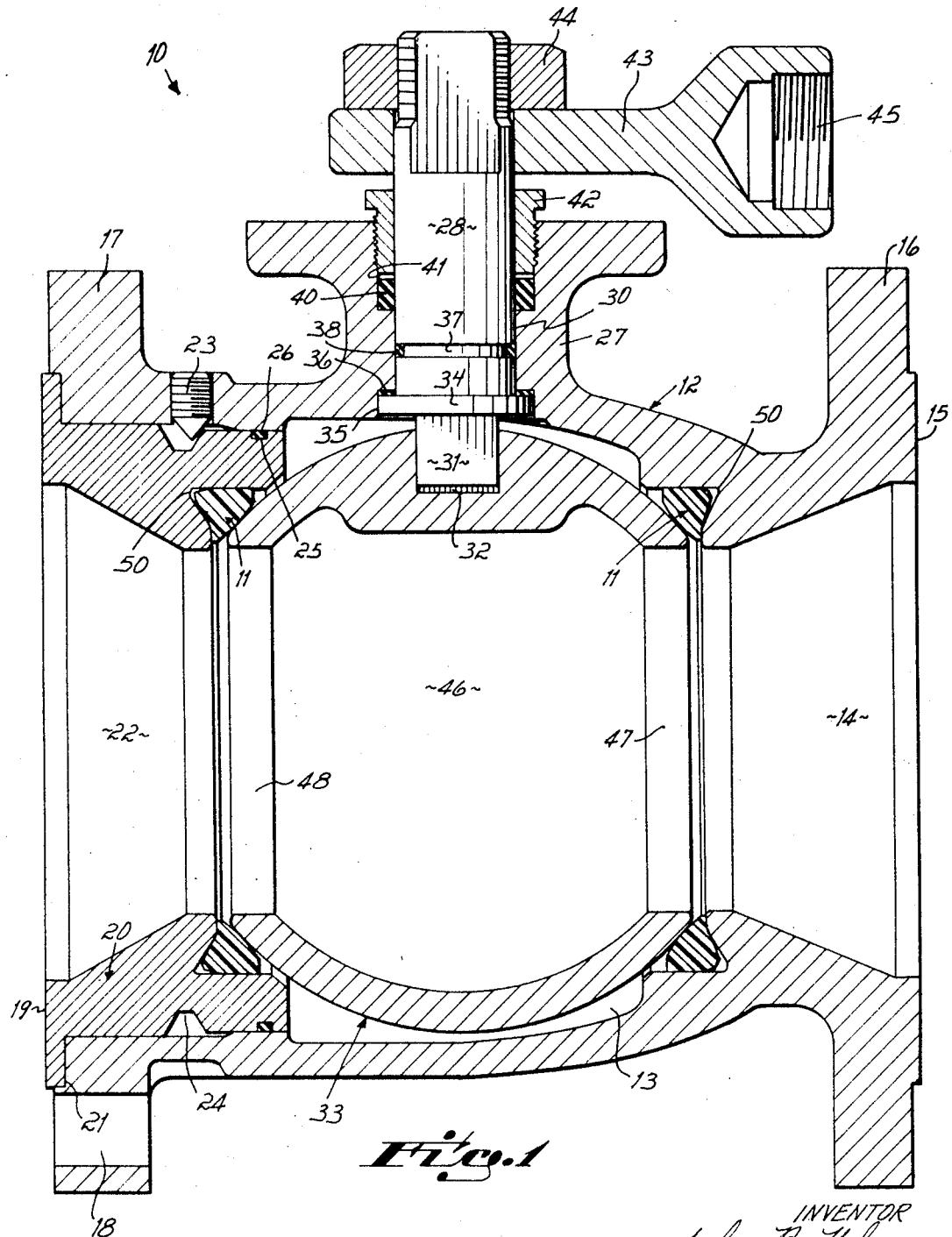
FIGURE 1 is a vertical, longitudinal cross-sectional view of a valve provided with seats constructed in accordance with the principles of the present invention.
Figure 2:
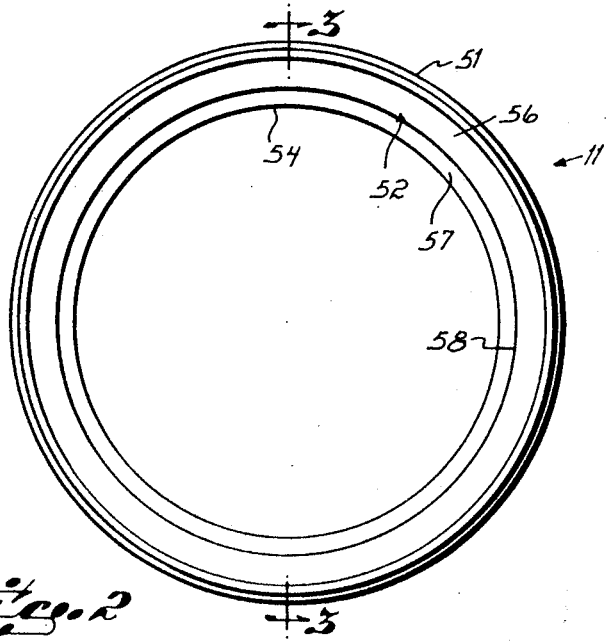
FIGURE 2 is a plan view of a preferred form of seat ring looking toward a ball contact face.
Figure 3:
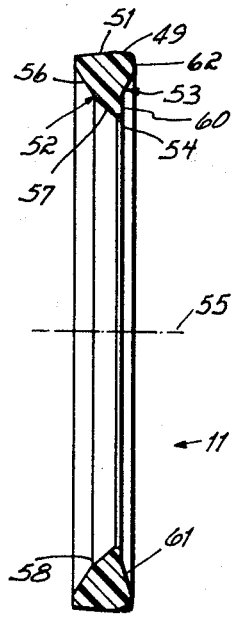
FIGURE 3 is a cross-sectional view taken along line 3—3 of FIGURE 2.

One form of ball valve 10 provided with seat rings 11—11 constructed in accordance with the principles of the present invention is shown in FIGURE 1. It is to be understood, however, that the present seat rings can be utilized with other types of ball valves, such as those embodying a flattened ball as disclosed in Edmund P. Lunken U.S. Patent No. 3,047,007 for "Ball Valve." Moreover, while the ball valve 10 shown in FIGURE 1 is of the "end entry" type, it is to be understood that the present seats can be utilized with other types of "top entry" ball valves.

As is shown in FIGURE 1, ball valve 10 comprises a body 12 formed of any suitable material, such as bronze, carbon steel, stainless steel, a rigid plastic such as polyvinyl chloride, or the like. The body 12 icnludes a central valve chamber 13 which communicates with an end port 14. End port 14 is of circular configuration and in the embodiment shown tapers outwardly toward the end wall 15 of the valve body. The valve body also includes an end flange 16 provided with suitable bolt openings (not shown) for joining the valve to a fluid line.

The opposite end of the valve body is provided with a similar end flange 17 including a plurality of bolt openings 18 for securing this flange to an adjacent fluid line. An annular cap member 20 is inserted in a cylindrical bore formed in body 12 interiorly of flange 17. Annular cap member 20 includes an outer flange 19 which seats in an annular recess 21 formed in end flange 17. The cap member 20 is configured to form an end port 22 substantially identical with end port 14 formed in body 12. The end member 20 is held in position by means of a plurality of set screws 23 in engagement with a wedge-shaped peripheral groove 24 formed about the circumference of member 20. Another annular circumferential opening 25 in member 20 receives an O-ring 26 effective to provide a seal between member 20 and body 12.

Body 12 also is provided with a bonnet 27 formed on the upper portion of the body for receiving operating stem 28. This stem passes downwardly through a cylindrical bore 30 in the bonnet and terminates in a flatted end portion 31 fitted within a transverse slot 32 formed in a ball member 33. Slot 32 permits axial movement of the ball in the closed position.

Stem 28 includes a flange 34 received within an annular enlarged opening 35 formed in the bonnet. A suitable annular thrust washer 36 is disposed between flange 34 and the adjacent shoulder formed on the body. Stem 28 also is provided with an annular recess 37 which receives an O-ring 38 disposed between the stem and the adjacent wall of the bonnet. Another sealing member 40 is disposed in an upper enlarged cylindrical opening 41 in the bonnet and is held in place by gland 42 which threadably engages bonnet 27. The uppermost end of stem 28 is flatted and receives an operating handle 43. The handle is held in place by a nut 44 threaded over the end of the stem. As shown, the operating handle 43 is threaded as at 45 to provide connection to a handle.

Fluid flow through the valve is controlled by the position of ball 33. This ball is of generally spherical external configuration and is provided with a generally cylindrical diametral bore 46. The ends 47 and 48 of the cylindrical bore 46 are substantially the same size as the adjacent portions of end ports 14 and 22. Ball 33 is rotated by rotation of stem 28. When the valve is open, ball 33 is rotated so that bore 46 is aligned with ports 14 and 22 to permit straight line flow through the valve. When the ball 33 is rotated 90° to a closed position, bore 46 extends transversely of the valve and fluid flow is blocked by solid wall portions of the ball. It is to be understood that flow can take place through the valve in either direction and the valve is effective to stop flow in either direction.

The portions of the valve described above are conventional and have been disclosed in some detail to provide a complete understanding of the environment of the present novel seat construction. Thus, the novelty of the present invention resides in the configuration of the seats in combination with the configuration of the recess in which the seats are mounted which provides a novel mode of operation of the seats. More particularly, as shown in FIGURES 1, 2, 3, 6 and 7, seats 11 are mounted in recess 50 surrounding end ports 14 and 22. These seat rings provide the sole support for ball 33 and function to provide a seal between that ball and valve body 12 and cap member 20.

As shown in FIGURES 2, 3, 6 and 7, seat ring 11 is of annular configuration. These seat rings can be made of any suitable material, such as Teflon, Buna-N, Kel-F or the like. The seat ring includes an outer wall 51, a ball engaging face 52, a rear face 53 and a narrow inner diameter wall 54, the diameter of which is slightly larger than the diameter of ports 14 and 22.

More specifically, the major portion of outer wall 51 is planar in cross-section and extends at an angle of the order of 10° to the longitudinal axis 55 of the seat ring which is the same as the flow axis through the valve when the seats are assembled. The rear portion 49 of wall 51 is angulated with respect to the main portion of the wall 51, and extends parallel to axis 55. The ball engaging face 52 consists of two conical surfaces 56 and 57 which meet at an apex 58. These conical surfaces 56 and 57 are angulated so that when the seat is loaded as shown in FIGURE 7, the conical surfaces form substantially equal angles with the adjacent surface of the ball. The rear wall 53 of the seat includes an annular flat section, or shoulder, 60 extending outwardly from the inner diameter of the ring in a plane normal to the axis 55 of the ring. Rear wall 53 further includes an outwardly tapered section 61 which extends between inner flat portion 60 and an outermost flat portion 62 adjacent to the outer diameter of the seat ring.

The relationship of the seat ring 11 to the recesses 50 in which it is seated is best shown in FIGURES 1, 6 and 7. It is to be understood at this point that both seat rings 11 are identical with one another as are both recesses 50. Accordingly, only the recess in the main body portion 12 will be described in detail. As there shown, recess 50 includes a peripheral wall 64 which is cylindrical and concentric with the axis 55. The recess includes an outwardly tapered rear wall 67 which extends outwardly at a smaller angle from axis 55 than the rear wall section 61 of the seat. Finally, the recess 50 includes a flat shoulder section 68 disposed at the inner portion of the recess surrounding the port 14. This wall extends in a plane normal to the axis 55 of the valve and provides a seat for inner shoulder, or flat, 60 of the seat.

The relationship of the seat ring 11, ball 33 and recess 50 when the seat ring is initially assembled is best shown in FIGURE 6. As there shown, the seat ring 11 is disposed within recess 50 with flat shoulder 60 of the seat ring seated upon flat shoulder 68 of the recess. Flat section 49 of the outer wall is in engagement with the outer wall 64 of the recess. The main outer wall section 51 of the seat ring is disposed at an angle X with the outer wall 64 of the recess. Similarly, tapered rear wall 61 of the ring is disposed at an angle Y with respect to the tapered rear wall 67 of the recess. Preferably, these angles are equal. Prior to loading of the seat the crest, or apex, 58 of the seat engages the outer surface of ball 33 in substantially circular line contact.

When a load is applied to the seat by forcing cap member 20 and ball 33 inwardly, i.e. to the right in FIGURE 1, the seat member 11 rotates or rolls around a circular neutral axis away from the ball toward the side wall 67 and outer wall 64 of the body recess. At the same time, as the load increases, the seat undergoes local deformation in the area of its contact with the ball, i.e. at crest or apex 58. This contact area increases and becomes a narrow annular band contact.

The initial load, or squeeze, on the seat is greater than the maximum load applied to the seat by the ball at the rated line pressure when the valve is closed. In a typical valve the ball is deflected twenty-five to forty thousandths of an inch with the loading pressure being of the order of 2000 p.s.i. When the valve is closed and pressure is applied to the ball on the upstream side, the load on the upstream seat will be decreased and the upstream seat will tend to roll or rotate about its neutral axis away from the tapered rear wall of the body recess. However, because of the high initial load the upper seat ring will retain sufficient load or pressure against the ball to maintain a tight seal.

It is to be understood that the contact between the crest on the seat rings and the ball results in a high initial contact pressure per unit area which provides tight sealing at low pressures. However, the large included angle for the crest results in a substantial increase of contact area at high pressures and thereby prevents excessive unit loading in the contact area. It is also to be observed that when the seat is fully loaded as shown in FIGURE 7, both walls 56 and 57 on opposite sides of the crest form approximately equal angles with the ball. This perimts the port openings 47 or 48 in the bore of the ball to gradually climb over the crest as the valve is opened and closed without catching or tearing the seating surfaces. Finally, it will be observed in FIGURES 1, 6 and 7 that the shape of body recess 50 defines in essence a wedge-shaped space between the ball and bore 14. This configuration confines the seat ring and resists any tendency of the seat ring to roll or blow out when the valve is opened or turned.

Figure 4:
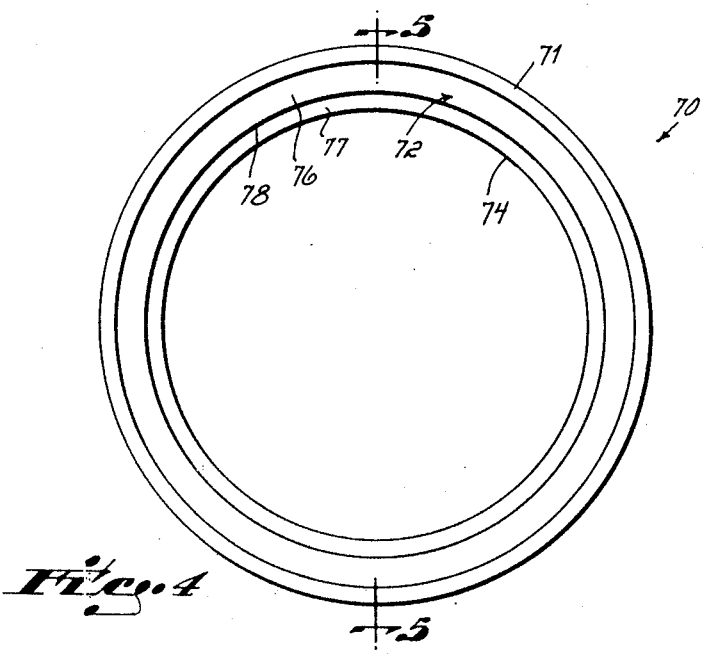
FIGURE 4 is a plan view of a modified form of seat ring.
Figure 5:
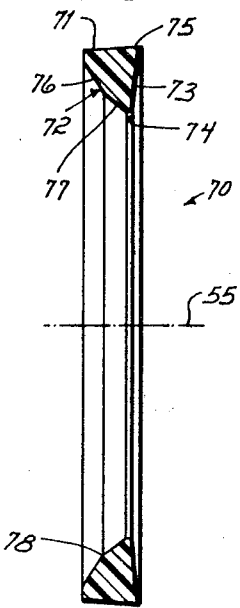
FIGURE 5 is a cross-sectional view through the modified form of seat ring taken along line 5—5 of FIGURE 4.

A modified form of seat ring is shown in FIGURES 4 and 5 and the relationship between this seat ring and a modified body recess is shown in FIGURES 8 and 9. More particularly, the modified form of seat ring 70 shown in FIGURES 4 and 5 is of annular configuration. Seat ring 70, as shown in FIGURES 4 and 5, is of annular configuration and includes an outer wall 71, a ball engaging wall 72, a rear wall 73 and an inner diameter wall 74. Outer wall 71 includes a main section disposed at an angle with respect to axis 55 of the seat ring and ball valve. A small section 75 of the seat ring adjacent to the rear wall is of cylindrical configuration concentric with axis 55. The ball engaging wall 72 of the seat ring comprises two conical sections 76 and 77 meeting at a crest 78. These wall sections are configured like wall sections 56 and 57 of seat ring 11 and are positioned so that when the seat is loaded as shown in FIGURE 9, wall sections 76 and 77 make approximately equal angles with ball 33. Innermost wall 74 of this seat ring is of cylindrical configuration concentric with axis 55 and is of slightly larger diameter than the diameter of port 14. Rear wall 73 of the seat is planar and is normal to the axis 55 of the seat.

When the seat is initially installed in the valve it assumes the position relative to its associated recess 80 shown in FIGURE 8. As there shown, recess 80 includes an outer cylindrical wall 81 which is concentric with axis 55 of the seat. The recess further includes an inner shoulder or flat 82 surrounding the bore 14. This shoulder, or flat, is normal to axis 55. Finally, the recess includes an outwardly tapered wall 83 disposed at an angle to both a plane normal to axis 55 and to axis 55. In the embodiment shown in FIGURES 8 and 9, the tapered wall 83 of the housing forms an angle V relative to wall 73 of the seat which is slightly greater than the angle U formed between the outer wall 81 of the recess and outer wall 71 of the seat.

When the seat is loaded by forcing the ball 33 to the right as explained previously, seat 70 rolls or rotates about its circular neutral axis with wall 73 remaining in contact with flat 82. The seat rolls until its outer wall 71 contacts adjacent wall 81 of the recess. Again, it will be noted that prior to the time the seat is loaded, its crest 78 engages ball 33 in a substantially circular line contact. However, as the load upon the seat is increased, the area of this contact expands to narrow band contact as shown in FIGURE 9. Again, the initial load on seat 70 is greater than the load applied to the ball by full line pressure. Therefore, when the valve is closed, the upstream seal remains in pressure contact with the ball to provide an effective seal.

Still another modification of the seat is shown in FIGURES 10–13. As there shown, seat 90 is an annular seat having an outer wall 91, a ball engaging wall 92, an inner wall 93 and a rear wall 94. Outer wall 91 is planar and is disposed at an angle to axis 55 of the seat. Again, ball engaging wall 92 is formed of two conical surfaces 95 and 96 meeting at a crest 97. Conical surfaces 95 and 96 are disposed so that when the seat is loaded, as shown in FIGURE 13, they form substantially equal angles with ball 33. The inner wall 93 is a narrow cylindrical wall concentric with axis 55 and of a diameter slightly greater than the maximum diameter of port 14. Rear wall 94 is angulated with respect to axis 55 and forms an acute angle with outer wall 91.

The cooperating recess 98 for receiving seat 90 is shown in FIGURES 12 and 13. As there shown, recess 98 includes a cylindrical outer wall 100 concentric with axis 55 of the seat and valve. The recess also includes a rear wall 101 which is angulated with respect to the flow axis 55 of the valve at a lesser angle than the angle formed with axis 55 by wall 94.

As shown in FIGURE 12, wall 101 terminates outwardly a short distance from port 14 and is joined to the port by narrow conical wall 102 forming an obtuse angle with port 14. When the seat 90 is initially inserted in the valve in an unloaded condition, crest 97 makes circular line contact with ball 33. Outer wall 98 of the seat is disposed at an angle P with respect to outer wall 100 and rear wall 94 is disposed at an angle Q with respect to rear wall 101 of the recess. Preferably, angles P and Q are approximately equal to one another.

When the seat is loaded by shifting ball 33 to the right as shown in FIGURE 13, seat 98 rotates about its circular neutral axis until wall 94 engages wall 101 and wall 98 engages wall 100. Again, as explained previously, the initial load on this seat is greater than the maximum load on the ball at rated fluid pressure. Thus, when the valve is closed, the upstream seal tends to rotate back about its neutral axis toward the ball, but remains in pressure contact with the ball to effect a fluid-tight seal. It is also to be noted that when a load is applied to the seat, the original line contact made by crest 97 with the ball is widened into a narrow band contact to prevent excessive unit loading on the seat. Finally, it is to be noted that wall 101 again defines a wedge-shaped opening with respect to the ball which is effective to prevent the seat from rolling or being blown out as the valve is opened or closed.

From the foregoing disclosure of the general principles of the present invention and the above description of several exemplary embodiments, those skilled in the art will readily comprehend various modifications to which the invention is susceptible. Therefore, I desire to be limited only by the scope of the following claims.

Having described my invention, I claim:

1. A ball valve comprising a body having a valve chamber, inlet and outlet openings communicating with said chamber, a ball mounted within said chamber and having a port therethrough, means for rotating said ball, said body having an annular recess surrounding and concentric with each of said inlet and outlet ports, each of said recesses including a peripheral outer wall and a rear wall, said rear wall and outer wall meeting at an acute angle to form a wedge-shaped cavity, an annular seat ring disposed within each of said recesses, each of said seat rings being formed from a flexible material and having an inner diameter corresponding to the diameter of said ports, each of said seat rings further comprising two frustoconical sections meeting at a crest, said crest constituting a ball engaging surface in contact with said ball, a rear wall opposite said ball engaging surface and including a portion in engagement with said rear wall of said recess adjacent to the inner diameter of said seat ring, and an outer wall, said outer wall and outer portion of said rear wall being spaced from the adjacent walls of said recess when no load is applied to said seat, the rear wall and outer wall of said seat ring meeting at an angle slightly greater than the angle formed by the outer wall and rear wall of said recess, each of said seats being preloaded upon assembly of said valve by contact with said ball and being rotated about the neutral axis of said seat away from said ball, said ball subjecting said seat rings to a preload force at least equal to the force applied to said ball by the rated line pressure of the valve, further loading of one of said seats causing said seat to be forced into said wedge-shaped cavity and held against dislodgement therefrom.

2. The valve of claim 1 in which the outer wall of each said seat ring in the unloaded condition is disposed at an angle to the axis of said seat ring, and the outer peripheral wall of said recess is concentric with the axis of said seat ring.

3. The valve of claim 2 in which the rear wall of each said seat ring is disposed at an angle to a plane normal to the axis of said seat ring and the rear wall of each said housing recess being disposed at a greater angle to a plane normal to the axis of said seat ring.

4. The valve of claim 1 in which the outer wall of each said seat ring in an unloaded condition includes a portion which extends at an angle to the axis of said seat ring and the rear wall of each said seat ring includes a portion which extends at an angle to a plane normal to said axis, said rear wall further including an annular section adjacent to the inner diameter of the ring normal to the axis of said ring, said rear wall of each said recess including a cooperating shoulder normal to the axis of said seat ring, said shoulder being in engagement with said last named portion of said seat ring rear wall.

5. The valve of claim 3 in which in the fully loaded condition the outer wall of one said seat ring engages the outer peripheral wall of the associated recess and the rear wall of said seat ring engages the rear wall of said associated recess.

References Cited
UNITED STATES PATENTS

| | | | |
|---|---|---|---|
| 2,945,666 | 7/1960 | Freeman | 251—175 X |
| 2,989,990 | 6/1961 | Bass | 251—315 X |
| 3,067,978 | 12/1962 | Natho | 251—315 X |
| 3,146,988 | 9/1964 | Riopelle | 251—315 |
| 3,171,429 | 3/1965 | Sturmer | 251—170 X |
| 3,331,581 | 7/1967 | O'Connor | 251—315 |
| 3,347,517 | 10/1967 | Scaramucci | 251—315 |

CLARENCE R. GORDON, Primary Examiner

U.S. Cl. X.R.

251—175, 315